United States Patent
Herring et al.

(10) Patent No.: US 9,082,413 B2
(45) Date of Patent: Jul. 14, 2015

(54) ELECTRONIC TRANSACTION AUTHENTICATION BASED ON SOUND PROXIMITY

(71) Applicant: International Business Machines Corporation, Armonk, NY (US)

(72) Inventors: Dean F. Herring, Youngsville, NC (US); Ethan G. Holder, Raleigh, NC (US); Brad M. Johnson, III, Raleigh, NC (US); Adrian X. Rodriguez, Durham, NC (US); Jeffrey J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 13/667,686

(22) Filed: Nov. 2, 2012

(65) Prior Publication Data

US 2014/0129231 A1    May 8, 2014

(51) Int. Cl.
| | |
|---|---|
| *G10L 25/51* | (2013.01) |
| *G06Q 20/30* | (2012.01) |
| *H04W 12/06* | (2009.01) |
| *G06Q 20/40* | (2012.01) |
| *H04L 29/06* | (2006.01) |

(52) U.S. Cl.
CPC .............. *G10L 25/51* (2013.01); *G06Q 20/401* (2013.01); *H04W 12/06* (2013.01); *H04L 63/0492* (2013.01)

(58) Field of Classification Search
CPC ...... G10L 25/51; G06Q 20/30; G06Q 20/401; H04W 12/06; H04L 63/0492
USPC .............. 704/231, 270, 275, 273; 455/456.1, 455/456.3, 456.6; 705/67
See application file for complete search history.

(56) References Cited

U.S. PATENT DOCUMENTS

| | | | |
|---|---|---|---|
| 5,956,681 | A | 9/1999 | Yamakita |
| 6,272,457 | B1 | 8/2001 | Ford et al. |

(Continued)

FOREIGN PATENT DOCUMENTS

EP    1536306 A1    6/2005

OTHER PUBLICATIONS

Technology, "NSDT™ Technology", http://tagattitude.fr/products/technology, Jun. 8, 2012, 4 pages.

*Primary Examiner* — Martin Lerner
(74) *Attorney, Agent, or Firm* — Jeffrey L. Streets (57) ABSTRACT

A computer program product comprises computer usable program code for receiving data describing a proposed electronic transaction between first and second communications devices. Additional computer usable program code is provided for generating a first audio signal by sound detected by a first microphone of the first communications device, and for generating a second audio signal by sound detected by a second microphone that is part of the second communications device. Still further computer usable program code provides for authenticating that the first communications device and the second communications device are in the same proximity in response to determining that the first and second audio signals were produced by the same sound event, and for completing the proposed electronic transaction between the first and second communications device in response to authenticating that the first and second communications devices are in close proximity.

10 Claims, 3 Drawing Sheets

(56) References Cited

U.S. PATENT DOCUMENTS

| | | |
|---|---|---|
| 6,493,550 B1 | 12/2002 | Raith |
| 6,922,718 B2 | 7/2005 | Chang |
| 6,987,947 B2 | 1/2006 | Richenstein et al. |
| 7,669,760 B1 * | 3/2010 | Zettner .................. 235/382 |
| 7,872,574 B2 | 1/2011 | Betts et al. |
| 8,041,348 B1 | 10/2011 | Fujisaki |
| 8,070,062 B2 * | 12/2011 | Goel et al. ............. 235/383 |
| 8,126,398 B2 * | 2/2012 | Torrance et al. ........... 704/231 |
| 8,317,086 B2 | 11/2012 | Dudek et al. |
| 8,699,944 B2 * | 4/2014 | Malamud et al. ............ 704/270 |
| 2001/0023193 A1 | 9/2001 | Rhoads |
| 2002/0032751 A1 | 3/2002 | Bharadwaj |
| 2003/0036378 A1 | 2/2003 | Dent |
| 2003/0081739 A1 | 5/2003 | Hikishima |
| 2003/0105637 A1 | 6/2003 | Rodriguez et al. |
| 2004/0128514 A1 | 7/2004 | Rhoads |
| 2005/0010417 A1 * | 1/2005 | Holmes ................ 704/275 |
| 2005/0136949 A1 | 6/2005 | Barnes |
| 2006/0074494 A1 | 4/2006 | McFarland |
| 2006/0099967 A1 * | 5/2006 | Colvin et al. ............. 455/456.4 |
| 2006/0187867 A1 | 8/2006 | Panje |
| 2007/0109266 A1 | 5/2007 | Davis et al. |
| 2007/0192872 A1 | 8/2007 | Rhoads et al. |
| 2007/0293188 A1 * | 12/2007 | Houghton et al. ......... 455/404.2 |
| 2008/0037674 A1 | 2/2008 | Zurek et al. |
| 2008/0059170 A1 | 3/2008 | Bloebaum et al. |
| 2009/0176505 A1 * | 7/2009 | Van Deventer et al. .... 455/456.1 |
| 2010/0106647 A1 * | 4/2010 | Raman .................. 705/67 |
| 2010/0306670 A1 | 12/2010 | Quinn et al. |
| 2011/0060586 A1 | 3/2011 | Dhawan et al. |
| 2011/0184730 A1 | 7/2011 | LeBeau et al. |
| 2011/0217967 A1 | 9/2011 | Cohen et al. |
| 2011/0258121 A1 | 10/2011 | Kauniskangas et al. |
| 2011/0293095 A1 | 12/2011 | Ben Ayed |
| 2012/0051561 A1 | 3/2012 | Cohen et al. |
| 2012/0084131 A1 | 4/2012 | Bergel et al. |
| 2012/0093303 A1 | 4/2012 | Schultz |
| 2012/0128154 A1 * | 5/2012 | Ran .................. 380/255 |
| 2012/0179525 A1 * | 7/2012 | Seguin et al. ............. 705/14.16 |
| 2012/0205433 A1 | 8/2012 | Dudek et al. |
| 2012/0263020 A1 * | 10/2012 | Taylor et al. ............. 367/124 |
| 2012/0295637 A1 | 11/2012 | Hannuksela et al. |
| 2012/0317297 A1 | 12/2012 | Bailey |
| 2013/0024018 A1 | 1/2013 | Chang et al. |
| 2013/0050080 A1 | 2/2013 | Dahl et al. |
| 2013/0052963 A1 * | 2/2013 | Briden et al. ............. 455/73 |
| 2013/0053002 A1 | 2/2013 | Hymes |
| 2013/0159186 A1 * | 6/2013 | Brudnicki et al. ............. 705/44 |
| 2013/0171930 A1 * | 7/2013 | Anand et al. ............. 455/41.1 |
| 2014/0046664 A1 * | 2/2014 | Sarkar et al. ............. 704/246 |
| 2014/0201069 A1 * | 7/2014 | Arentz ................ 705/39 |

* cited by examiner

ELECTRONIC TRANSACTION AUTHENTICATION BASED ON SOUND PROXIMITY

BACKGROUND OF THE INVENTION

1. Field of the Invention

The present invention relates to authentication of an entity that is participating in an electronic communication.

2. Background of the Related Art

It is desirable for one entity to communicate with another entity with confidence that they are communicating with the intended entity. Authentication is the act of confirming the identity of an entity that you want to communicate with. Authentication techniques or protocols may be particularly useful in electronic communications. One such authentication technique includes the use of a password known only by the two entities. During a communication session, an entity must be able to present the password in order to be authenticated. Failure to present the correct password would typically result in a failure of the communication, denial of access to desired information, or a refusal to approve a transaction. Unfortunately, many such authentication techniques require significant prior communications or significant hardware or software infrastructure.

BRIEF SUMMARY OF THE INVENTION

Another embodiment of the invention provides a computer program product including computer usable program code embodied on a tangible computer usable storage medium. The computer program product comprising: computer usable program code for receiving data describing a proposed electronic transaction between a first mobile communications device and a second communications device; computer usable program code for generating a first audio signal by sound detected by a first microphone that is part of the first mobile communications device; computer usable program code for generating a second audio signal by sound detected by a second microphone that is part of the second communications device; computer usable program code for authenticating that the first mobile communications device and the second communications device are in the same proximity in response to determining that the first audio signal and the second audio signal were produced by the same sound; and computer usable program code for completing the proposed electronic transaction between the first mobile communications device and the second communications device in response to authenticating that the first mobile communications device and the second communications device are in close proximity. Other aspects or steps of the methods described herein may be implemented in the computer program product as computer usable program code for performing those aspects or steps.

DETAILED DESCRIPTION OF THE INVENTION

One embodiment of the present invention provides a method comprising receiving data describing a proposed electronic transaction between a first mobile communications device and a second communications device. A first audio signal is generated by sound detected by the first microphone that is part of the first mobile communications device, and a second audio signal is generated by sound detected by the second microphone that is part of the second communications device. The method further comprises authenticating that the first mobile communications device and the second communications device are in the same proximity in response to determining that the first audio signal and the second audio signal were produced by the same sound. The proposed electronic transaction between the first mobile communications device and the second communications device is completed in response to authenticating that the first mobile communications device and the second communications device are in close proximity.

The proposed electronic transaction can be almost any type of electronic transaction presently known or developed in the future. For example, the proposed electronic transaction may include a payment (i.e., a "proximity payment") or a transfer of data, such as a transfer of a music file or contact information. Such electronic transactions may be initiated by one of the first and second communications devices, and is preferably confirmed or agreed to by the other of the two communications devices. In some electronic transactions, one communications device may be a sender and the other communications device may be a recipient of a payment or data. However, other electronic transactions may include bi-directional transfers, such as a payment in exchange for a data file. Embodiments of the present invention may assure that the electronic transaction is completed between the intended devices or parties, and avoid involving an unintended device or party.

The proposed electronic transaction can be initiated by a first communication device contacting a second communication device, such as using a telephone number or selecting from a list of Bluetooth or wireless communication devices that the first communication device has discovered. This interaction or connection can be controlled by an application program running on the first and second communication devices. In embodiments that involve a service provider, both communication devices with or without special application programs may dial into the service and present the service with an audio signal generated by a microphone exposed to the sound. The service provider computer system may then determine whether the two communication devices heard the same sound by whether their audio signals match. If the audio signals match, then the two communications devices are determined to be in close proximity and a proposed electronic transaction may be completed. Meta data describing the terms of the proposed electronic transaction (amount, notes, date, and other info) may be communicated over the same call or these terms could be sent ahead of time through existing means.

Alternatively, the proposed electronic transaction may be initiated by communicating the proposed electronic transaction to a service provider, such as through a website interface, via a text message or through a telephone call, and then the service provider may connect to the first and second communications devices through a phone call to authenticate the proposed electronic transaction. The first and second communications device would then only be required to answer their respective calls and present the sound or audio cue that forms the audio signal that the service provider uses to authenticate the transaction.

In some embodiments of the invention, all of the steps from initiation to completion of the electronic transaction occur entirely within and between the first and second communications devices. For example, the proposed electronic transaction may be completed between an application running on the first mobile communications device and an application running on the second communications device without involving a third party communications device, perhaps via a direct wireless communication between the first mobile communications device and the second communications device.

In other embodiments, some of the steps may be performed by a third party service provider. For example, the third party service provider may receive the first and second audio signals, perform the authentication, and complete the proposed electronic transaction. In this embodiment, the first and second communications devices serve as interfaces for first and second users, respectively, and also utilize at least their microphones for generating the first and second audio signals used in the authentication.

Each communications device has a microphone that detects sound and generates an audio signal that is representative of the sound detected. When such communications devices are in close proximity, their respective microphones detect sounds that are substantially the same and the audio signals generated by those microphones will have substantially the same audio signal characteristics, such as sound frequencies, volume, content and/or other audio signal parameters.

In various embodiments, the first and second communications device may both be a mobile communications device, such as a mobile telephone, notebook computer, tablet computer, e-reader, or other category of mobile electronics device. However, in other embodiments, the first communications device may be a mobile communications device while the second communications device is a type that is not considered to be mobile. For example, the second communications device may be a point-of-sale computer or terminal, a stationary kiosk computer, a home or business desktop computer, a hard-wired telephone, television, set-top box or other such electronic device that may now or in the future have the capabilities to participate in an electronic transaction as disclosed herein.

In one embodiment, a first mobile communications device has a display that prompts the user to generate a sound or audio cue that is detectable by the first and second microphones. By prompting the user in this manner, the method can control the type of sound that is the source of the audio signals which will be used in the authentication. The prompt may instruct the user to say a specific word, perhaps having distinct consonant sounds that are easily discernible even with background noise. The prompt might alternatively instruct the user say their name, a password or some detail about the transaction, which might further serve as identifying the person using the first mobile communications device in addition to authenticating that the first mobile communications device is near the second communication device. Still further, the prompt may be in the nature of captcha text that is designed to be difficult for computers to decipher. In a modified embodiment, the first mobile communications device has a speaker that issues a voice prompt for the user to generate the sound. For example, the voice prompt might include audio that produces "Please say your name."

Yet another embodiment includes a further layer of data to confirm the proximity of the two communications devices that are party to the proposed electronic transaction. For example, the first and second mobile communications devices may be enabled to determine their own location using signals from a satellite positioning system, sometimes referred to as GPS. Accordingly, the first and second mobile communications devices may each generate data that indicates their locations, then compare those locations to determine the proximity of the two devices. This proximity can be used to verify or confirm the proximity determined by the sound-based authentication described herein. In embodiments where a third party service provider is involved in the electronic transaction, the service provider may receive a first location of the first mobile communications device as determined using a satellite navigation system, receive a second location of the second mobile communications device as determined using a satellite navigation system, and determine that the first location and the second location are within a predetermined distance of separation. Optionally, the electronic transaction may be declined in the distance of separation exceeds the predetermined distance. Similarly, the proposed electronic transaction between the first mobile communications device and the second mobile communications device may be completed in response to determining that the first location and the second location are within the predetermined distance of separation. As a rough alternative to the use of a satellite navigation system, the proximity of the communications devices may be determined by whether the first and second communications devices are connected to the same or nearby cell towers and/or triangulation of the signals.

In other embodiments of the invention, the sound that is detectable by the first and second microphones may be generated by a speaker that is part of the first or second communications devices. This may be advantageous in that at least one of the communications devices controls when and what sound is generated. This may be a predetermined sound or a sound that is determined based upon one or more present conditions. For example, the sound might be a voice statement of the amount of the transaction, such as "Forty-five dollars and no cents." Alternatively, the sound might be a frequency that will stand out from any presently detectable background noise.

In a further option, a first communications device has a first speaker that generates a first sound having a first frequency and a second communications device has a second speaker that generates a second sound having a second frequency that is different than the first frequency. At least one of the first microphone and the second microphone may then be used to detect the first sound and the second sound and detect changes in sound pressure at the nodes or anti-nodes, or detect the beat frequency, of the first and second sounds.

Yet another embodiment may include determining a distance between the first mobile communications device and the second communications device by measuring a time delay or difference in volume between the sound detected at the first microphone and the same sound detected at the second microphone.

Another embodiment of the invention provides a computer program product including computer usable program code embodied on a tangible computer usable storage medium. The computer program product comprising: computer usable program code for receiving data describing a proposed electronic transaction between a first mobile communications device and a second communications device; computer usable program code for generating a first audio signal by sound detected by a first microphone that is part of the first mobile communications device; computer usable program code for generating a second audio signal by sound detected by a second microphone that is part of the second communications device; computer usable program code for authenticating that the first mobile communications device and the second communications device are in the same proximity in response to determining that the first audio signal and the second audio signal were produced by the same sound; and computer usable program code for completing the proposed electronic transaction between the first mobile communications device and the second communications device in response to authenticating that the first mobile communications device and the second communications device are in close proximity. Other aspects or steps of the methods described herein may be implemented in the computer program product as computer usable program code for performing those aspects or steps.

Figure 1:
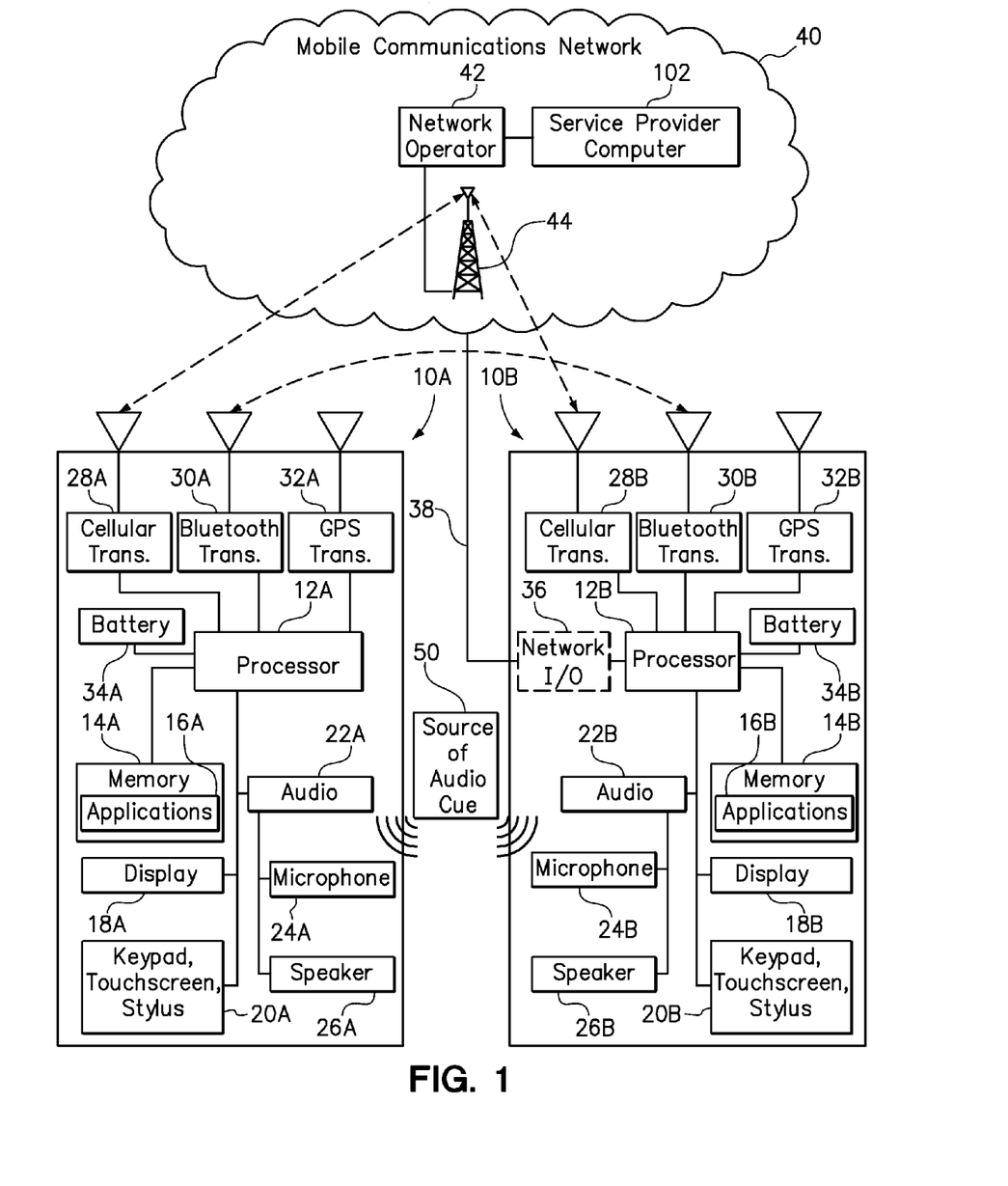
FIG. 1 is a diagram of first and second communications devices capable of performing a transaction.

FIG. 1 is a diagram of a first communications device 10A and a second communications device 10B capable of participating in an electronic transaction. The first and second communications devices may be, and are shown as being, substantially identical. Accordingly, the description here describes the first communications device 10A as being representative of the second communications device. In an actual implementation of the invention, it is not necessary for the two communications devices to be substantially identical.

The first communications device 10A includes a processor 12A in communication with memory 14A, which may include one or more application 16A. The processor 12A is also in communication with various components over a input/output bus, including a display 18A, a keyboard, touch screen or stylus 20A, and an audio module 22A that includes a microphone 24A and a speaker 26A. One or more wireless communications devices may also be included, such as a cellular transceiver 28A, Bluetooth transceiver 30A, and/or a satellite navigation receiver 32A. Each of these components may be powered by a battery 34A, but other power sources may be used as available. The second communications device 10B is shown with an optional network input/output port 36 that can communication with a network 40 via a landline 38.

As shown, various embodiments of the invention may utilize the cellular transceiver 28A to communicate with a network operator 42 over a cellular communications tower 44. The network operator 42 may pass along communications to a service provider computer 102 in some embodiments of the invention.

A generic "source of audio cue" 50 is shown generating a sound that is detectable by the microphones 24A, 24B. In accordance with the previous discussions, the source 50 may be a user's voice, or one or both of the speakers 26A, 26B. For example, a user of the first communication device 10A may read a prompt on the display 18A and create a sound according to the prompt. If the two communications devices 10A, 10B are in close proximity, both of the microphones 24A, 24B will detect the sound and generate audio signals that are provided to the respective processors 12A, 12B for routing to the output channel. As shown, the audio signals are sent via the cellular transceivers 28A, 28B to the cellular communications tower 44 and on to the network provider 42 or the service provider 102. The service provider 102, for example, may then compare the two audio signals and authenticate the proximity of the first and second communications devices 10A, 10B.

Further embodiments of the methods of this invention may be implemented using such communications devices. In particular, the two communications devices 10A, 10B may communication directly using the Bluetooth transceivers 30A, 30B. Accordingly, the two devices may propose a transaction, generate or prompt a user to generate a sound, generate audio signals, authenticate the proximity of the two devices, and complete an electronic transaction without involving the network 40, the network operator 42, or the service provider 102.

Figure 2:
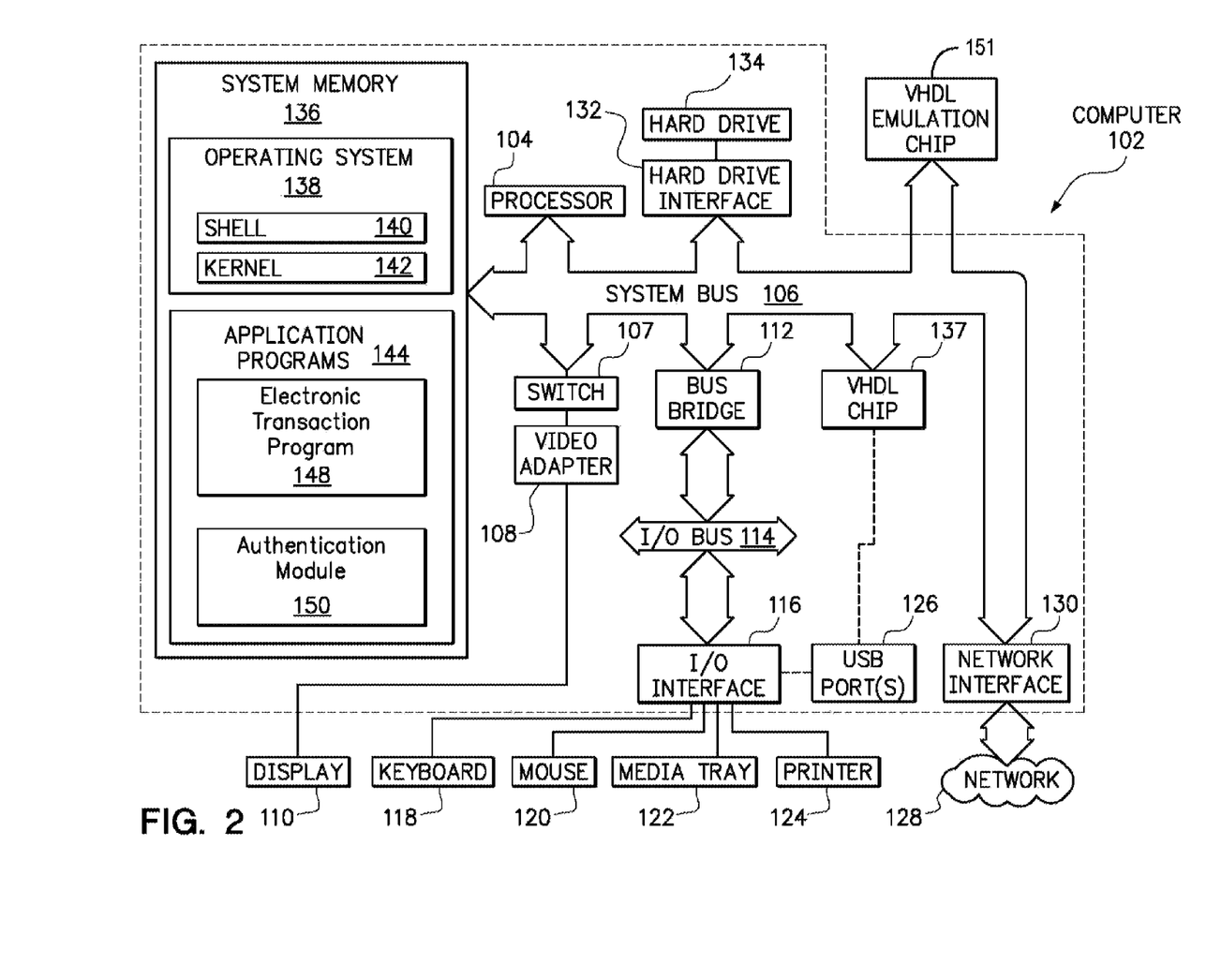
FIG. 2 is a diagram of a computer system that may be used by a transaction service provider.

FIG. 2 is a diagram of an exemplary computing node (or simply "computer") 102 that may be utilized in accordance with one or more embodiments of the present invention. Note that some or all of the exemplary architecture, including both depicted hardware and software, shown for and within computer 102 may be implemented in the service provider computer 102 as shown in FIG. 1.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate over a network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management. Application programs 144 in the system memory of computer 102 may include an electronic transaction program 148 and an authentication module 150 for implementing the methods described herein.

Also stored in the system memory 136 is a VHDL (VHSIC hardware description language) program (not shown). VHDL is an exemplary design-entry language for field programmable gate arrays (FPGAs), application specific integrated circuits (ASICs), and other similar electronic devices. In one embodiment, execution of instructions from a virtual machine for parallel processing (VMPP) causes the VHDL program to configure the VHDL chip 137, which may be an FPGA, ASIC, or the like.

In another embodiment of the present invention, execution of instructions from VMPP results in a utilization of VHDL program to program a VHDL emulation chip 151. VHDL emulation chip 151 may incorporate a similar architecture as described above for VHDL chip 137. Once VMPP and VHDL program program VHDL emulation chip 151, VHDL emulation chip 151 performs, as hardware, some or all functions described by one or more executions of some or all of the instructions found in VMPP. That is, the VHDL emulation chip 151 is a hardware emulation of some or all of the software instructions found in VMPP. In one embodiment, VHDL emulation chip 151 is a programmable read only memory (PROM) that, once burned in accordance with instructions from VMPP and VHDL program, is permanently transformed into a new circuitry that performs the functions needed to perform the processes of the present invention.

The hardware elements depicted in computer 102 are not intended to be exhaustive, but rather are representative components suitable to perform the processes of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 3:
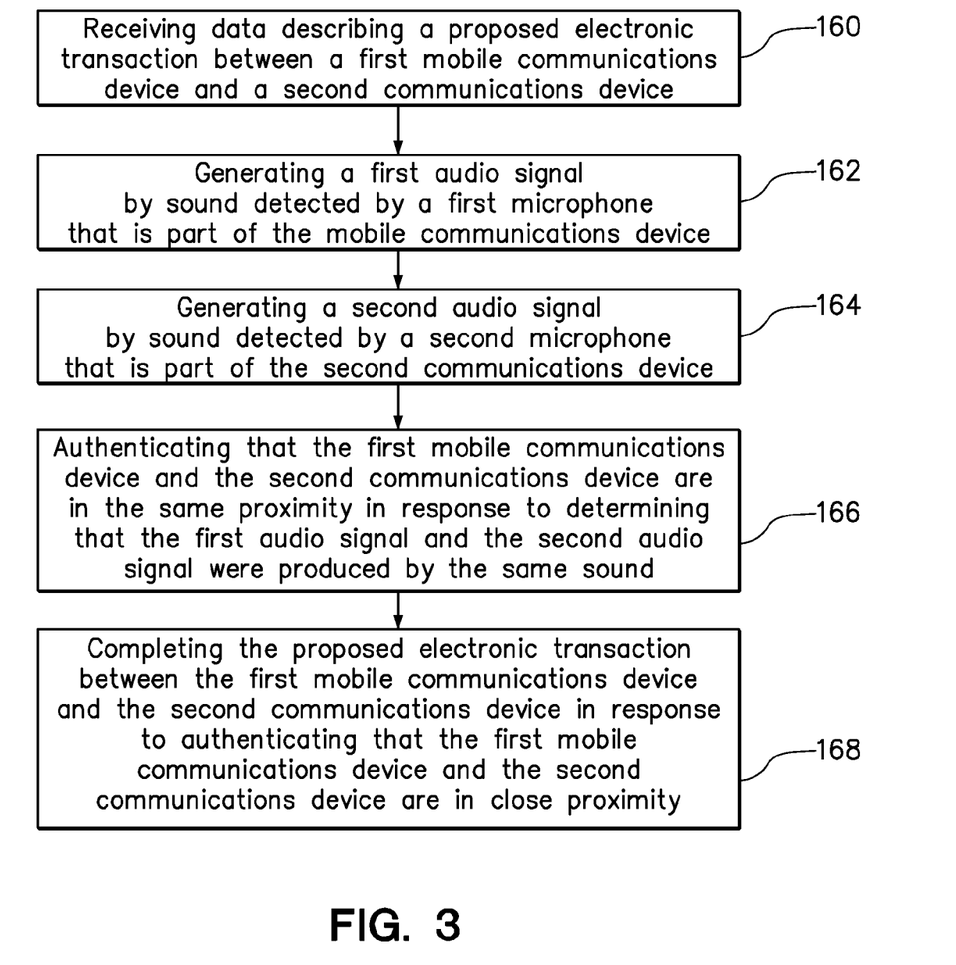
FIG. 3 is a flowchart of a method in accordance with one embodiment of the present invention.

FIG. 3 is a flowchart of a method in accordance with one embodiment of the present invention. In step 160, the method includes receiving data describing a proposed electronic transaction between a first mobile communications device and a second communications device. In step 162, a first audio signal is received from the first mobile communications device having a first microphone, wherein the first audio signal is generated by sound detected by the first microphone, and, in step 164, a second audio signal is received from the second communications device having a second microphone, wherein the second audio signal is generated by sound detected by the second microphone. In step 166, the method authenticates that the first mobile communications device and the second communications device are in the same proximity in response to determining that the first audio signal and the second audio signal were produced by the same sound event. Then, in step 168, the method completes the proposed electronic transaction between the first mobile communications device and the second communications device in response to authenticating that the first mobile communications device and the second communications device are in close proximity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a non-transitory computer readable storage medium, the computer program product comprising:

computer usable program code for receiving data describing a proposed electronic transaction between a first mobile communications device and a second communications device;

computer usable program code for generating a first audio signal by sound detected by a first microphone that is part of the first mobile communications device;

computer usable program code for generating a second audio signal by sound detected by a second microphone that is part of the second communications device;

computer usable program code for authenticating that the first mobile communications device and the second communications device are in the same proximity in response to determining that the first audio signal and the second audio signal were produced by the same sound event;

computer usable program code for completing the proposed electronic transaction between the first mobile communications device and the second communications device in response to authenticating that the first mobile communications device and the second communications device are in close proximity; and computer usable program code for causing at least one of the first microphone and the second microphone to detect a first sound and a second sound so that at least one of the first mobile communications device and the second communications device can detect changes in sound pressure at the nodes or anti-nodes of the first and second sounds, wherein the first mobile communications device has a first speaker that generates the first sound and the second communications device has a second speaker that generates the second sound, and wherein the first and second sounds have different frequencies.

2. The computer program product of claim 1, further comprising:

computer usable program code for receiving a first location of the first mobile communications device as determined using a satellite navigation system;

computer usable program code for receiving a second location of the second mobile communications device as determined using a satellite navigation system; and computer usable program code for determining that the first location and the second location are within a predetermined distance of separation.

3. The computer program product of claim 2, wherein completing the proposed electronic transaction between the first mobile communications device and the second mobile communications device is further in response to determining that the first location and the second location are within a predetermined distance of separation.

4. The computer program product of claim 3, further comprising:

computer usable program code for determining a distance between the first mobile communications device and the second communications device by measuring a time delay between the sound detected at the first microphone and the sound detected at the second microphone.

5. The computer program product of claim 1, wherein the proposed electronic transaction is completed between an application running on the first mobile communications device and an application running on the second communications device without involving a third party communications device.

6. The computer program product of claim 1, wherein the proposed electronic transaction includes a payment.

7. The computer program product of claim 1, wherein the proposed electronic transaction is a transfer of data.

8. The computer program product of claim 1, wherein the proposed electronic transaction is a transfer of a music file.

9. The computer program product of claim 1, wherein the second communications device is a mobile communications device.

10. The computer program product of claim 1, wherein the proposed electronic transaction is completed via a direct wireless communication between the first mobile communications device and the second communications device.

* * * * *